Patented Mar. 11, 1941

2,234,484

UNITED STATES PATENT OFFICE 2,234,484

MOISTURE-REPELLENT PRODUCT AND METHOD OF PRODUCING SAME

Arthur J. Weinig, Golden, Colo., assignor to Potash Company of America, Denver, Colo., a corporation of Colorado No Drawing. Application September 27, 1937, Serial No. 165,902

6 Claims. (Cl. 23—243)

This invention relates to moisture-repellent granules of hygroscopic compositions and to a method of producing the same.

Various hygroscopic materials, such as chemical salts for example, will absorb sufficient atmospheric or other moisture during storage and shipment to cause a caking of the particles thereof into "rock-like" consistency.

Where large quantities of such materials are stored in bins or warehouses, or are transported in railway cars or in the holds of ships and caking occurs, the resulting masses can be handled only with difficulty and must be broken by picking, or blasting, or other excavating methods employed on solid masses before such material can be moved or unloaded.

Consequently, important economic advantage is attained by the treatment of such materials at the place of origin to produce a free-flowing granular product, which does not possess the usual avidity of such a composition for atmospheric or other moisture.

It is a primary object of the present invention to produce moisture-repellent hygroscopic granules, which may be transported or stored in bulk without caking when subjected to atmospheric moisture or the like, in a process which is simple and inexpensive, as well as being highly efficient.

Another object of the invention is the provision of a method of treating chemical salts and the like during a refining process while the granules thereof are in an essentially moist condition, which results in the formation of a protective coating on the granules or particles after drying, which renders them moisture-repellent.

A further object of the invention is the utilization of certain constituents of chemical salts as a medium for the production of protective films or coatings on the individual particles of such salts.

Still another object of the invention resides in the selection of coating materials for the treatment of chemical salts and the like, which are amenable to controlled application to the individual particles of such salts.

A still further object of the invention resides in the utilization of established treatments, in the process of forming certain types of chemical salts, as a means of effecting the coating of the particles of such materials to render the same moisture-repellent.

Other objects reside in novel steps and treatments and in the production of novel products, all of which will appear more fully in the course of the following description.

The present application is a continuation-in-part of my co-pending application, Serial No. 81,729 of May 25, 1936, for Process of treating ores, Patented August 13, 1940, No. 2,211,397, and features described but not claimed in said aforesaid application, in response to the divisional requirement of August 1, 1936, have been made the subject matter of claims in this application.

The aforesaid application relates to a treatment of sylvinite ore, which consists mainly of sodium chloride and potassium chloride crystals, together with small amounts of other mineral matter, such as iron and manganese oxides, calcium and magnesium minerals, clays and the like.

The process of that application disclosed, inter alia, the separation of halite and sylvite constituents of sylvinite ore by a froth flotation treatment, and the production of dried crystals of potassium chloride as a final product of such treatment.

The potassium chloride secured as a result of that process is not the ordinary white, chemically refined potassium chloride, even though it possesses a high degree of purity. On the contrary, it is a granular material of pinkish color due to small amounts of iron oxide and manganese oxide which remain in and color the crystals and contribute evident advantages to the composition.

The grains of this product are water-repellent and have little, if any, tendency to cake or adhere together by absorbing moisture. This water-repellent condition is due to the fact that the potassium chloride granules are coated with insoluble lime and magnesium soaps, which have been formed by the combination of lime and magnesium salts in the ore, with the fatty acid or soaps employed as the flotation reagent of the process.

The soaped product favors absorption of oils which may be added in controlled amounts, under 1% by weight for example, before, during or after drying to increase the water-repellent properties, and by this means controlled repellent characteristics may be maintained in the final product.

Mineral oils or fractions thereof, such as fuel oil or kerosene; animal oils, such as oleic acid (red oil); or vegetable oils, such as palm oil or cocoanut oil are well suited for this purpose.

The usual method of drying particles of this character at the completion of the forming operation is to move the same through a revolving, fire heated, drum dryer or the like, which is effective for removing substantially all the moisture contained in a given mass of particles.

A treatment of this type is disclosed in the co-pending application of Leslie D. Anderson, Serial No. 100,491, in which utilization of a temperature range of 500° to 700° F. is effected to drive off volatile constituents of an oil coating and deposit a tarry residue on hygroscopic particles which renders them water-repellent.

The product of the present invention includes a variety of compositions, such as sodium chloride, sodium sulphate, sodium carbonate, potassium chloride, potassium sulphate, potassium carbonate, potassium nitrate and potassium chlorate, for example, and particularly in the case of potassium nitrate and potassium chlorate care must be exercised to prevent the formation of explosive mixtures.

A suitable water-repellent coating may be applied to the surfaces of particles of these compositions by the application of films of lime and magnesium soaps of the type hereinbefore described.

In producing the product of the present invention, the water-repellent coating may either be applied in a wet or a dry state and the compositions which are to be rendered water-repellent likewise may be in a wet or a dry condition at the time the coating composition is applied.

While as stated hereinbefore, the methods of treatment herein disclosed are of general applications to hygroscopic granules of different composition, certain illustrative examples will be cited to clarify understanding of the present invention.

Thus, in the treatment of potassium chloride concentrate produced in the treatment of sylvinite ore, by any well-known method, or by the process of my co-pending application, Serial No. 81,729, the salts are usually recovered in the form of damp cakes from the centrifuges or filters. The moisture in this case exists as a saturated solution of the salt.

While in such damp state prior to drying, a small quantity of dissolved soap is mixed with the granules of the salt and the mixture is then subjected to the requisite drying. Crystalline salt from the solution deposits over the surface of the solid salt as a fine layer, and the saponaceous coating present is entrapped on and between this surface layer of crystalline matter.

Upon completion of the treatment, the individual granules are moisture-repellent to a degree sufficient to prevent caking during storage or shipment in bulk, even when exposed over long periods to contact with atmospheric moisture, and remain in an essentially free-flowing condition.

The invention further resides in the discovery that insoluble soaps in dry powdered form, such as calcium stearate and magnesium oleate, for example, may be mixed with dry salts of this character to produce water-repellent granules.

The action of the soaps employed in the present invention is to provide moisture-repellent films, or other deposits on or between surfaces of the salts. Therefore when small quantities of alkaline earth salts are present in the composition treated, such salts react with the soaps used as coating agents to deposit calcium, magnesium or other insoluble soaps on the granules, and these coatings possess water-repellent properties.

Whenever the compositions treated do not contain the alkaline earth salts in quantities sufficient to react and form insoluble soaps, small quantities of such salts, such as calcium chloride or magnesium sulfate for example, may be intermixed with the compositions being treated, and preferably in a water solution, prior to the application of the soaps.

In producing the product of the present invention, it is also advantageous under certain conditions to add oils, such as crude mineral oils, or fractions thereof, vegetable oils, such as palm oil or cocoanut oil, or animal oils, such as fats or oleic acid, to the soap solution, thereby emulsifying the oils. The foregoing operation may be practiced in conjunction with, or exclusive of, the use of alkaline earth salts.

As a substitute for the soap solution of the foregoing mixtures, sulfonated oils or sulfonated alcohols may be used to emulsify the oleaginous material. In certain treatments, the use of soaps or soap substitutes will produce an effective coating even though the granules treated contain no lime or magnesium salts.

The emulsifying action of the soaps on the oils serves to effect uniformity of admixture and facilitates surface spreading. The emulsified oils distribute evenly over the surface of the particles and adhere to the insoluble soaps formed thereon, increasing the water-repellent condition of the product. Further, even when no alkaline earth soaps are formed on the product, the drying in of the soap and oil mixture alone, serves to produce a water-repellent condition.

From the foregoing, it will be apparent that while a variety of compositions are included in the present invention, they are all hygroscopic in character, and it is this property which makes the presence of a moisture-repellent coating a requisite to the maintenance of a free-flowing, granular condition.

Since it is a desideratum of the present invention to maintain the compositions of the particles treated in a substantially unadulterated condition, care should be exercised in the selection of the coating material to avoid the use of any substance that will react chemically with the particles and change their compositions. A wide choice in selection is afforded by the compositions described herein as suitable for the purposes of the invention, to aid in avoidance of chemical reactions.

In this connection, it will be understood that the production of insoluble lime and magnesium soaps by reacting lime and magnesium salts inclusions of particles treated with saponaceous reagents does not alter the chemical content and character of the individual particles to any appreciable degree. The lime and magnesium content of such particles is relatively small, and the amount of insoluble soaps required to coat a particle of given size is likewise relatively small.

Therefore, the bulk of such a particle remains unchanged by the treatment, and except where a deficiency of lime or magnesium salts exists, the lime and magnesium content of the particle is not increased by the reaction.

Having thus described the essential features of the product of the present invention, reference will be made to preferred treatments for forming the product and certain illustrative examples will be cited to facilitate understanding thereof.

One method that is particularly suitable involves the treatment of the potassium chloride concentrate recovered as a product of the flotation separation of sylvinite ore constituents. In this case small amounts of magnesium and lime salts are always present, and by adding the soaps and/or oils to the final wash water when washing such concentrates on filters or centrifuges, a sufficient incorporation of the soap and/or oil is obtained to produce the non-caking properties when the product is dried.

Likewise soap and/or oil may be added to the cakes discharged from such filters or centrifuges, and mixed therewith, in which event after drying the product will have non-caking qualities.

It is also possible to employ a simple intermixture of dry, powdered alkaline earth soaps to the dried granular concentrate, and this also develops non-caking properties in the product, although the individual particles are not coated with the same uniformity and completeness that is attained when the emulsions and other moist coatings are applied to the particles.

Under such circumstances, the preferred quantity of soap used in wet mixing is from ½ to 5 pounds per ton of product when the same is added as a solution, and the oils used may vary from ½ to 10 pounds per ton of product. When a dry mix is used, from 5 to 20 pounds of dry alkaline earth soap per ton is generally required for effective coating.

It has been discovered that high temperatures in the drying action tend to burn the soap coating to carbonate, thereby destroying its moisture-repellent properties. Under these conditions the repellent condition may be restored by treating such material with 0.30–0.40% crude kerosene in which about 10% crude oleic acid is dissolved, after it has passed the dryer, to again deposit insoluble soaps on the particles.

The resulting product thus produced has the necessary moisture-repellent properties for maintenance of the free-flowing granular condition during storage and in shipment.

In the usual coating operation where damaging temperatures are not encountered, a highly satisfactory product is produced by first washing the concentrate crystals with a wash water containing small amounts of magnesium or lime salts, and then introducing a small amount of soapy water in the final wash water. This results in a uniform distribution and precipitation of lime and magnesium soap on the concentrate particles, which after drying possess excellent moisture-repellent properties.

It will be understood that where a drying action is referred to in the specification it is not essential that it be the heating action of a revolving drum dryer. An evaporating action will give good results under certain circumstances and this includes exposure to ordinary atmospheric conditions, blowing dry air over the salts, or subjecting moist salts to vacuum drying.

Similarly the present description is not intended to define all the methods that may be employed for forming the product of the present invention and the examples cited merely illustrate what in practice has been found to give satisfactory and economical results.

Changes and modifications may be availed of within the spirit and scope of the invention as defined in the hereunto appended claims.

What I claim and desire to secure by Letters Patent is:

1. As a composition of matter, crystalline potassium chloride containing iron oxide and manganese oxide inclusions, the individual particles thereof having a coating of mineral oil and insoluble saponaceous material deposited in situ.

2. The process of rendering moisture repellent hygroscopic salt compositions containing lime or magnesium salts as impurities, which comprises reacting the lime and magnesium salts contained in said salt composition with a saponaceous agent by spreading an emulsion of oil and a soap over the moist surface of the particles of said salt composition and drying.

3. A composition of matter comprising crystalline potassium chloride particles having alkaline earth salts present as impurities, the said particles being coated with the reaction product of a soap-oil emulsion with the surface inclusions of said alkaline earth salts.

4. A composition of matter comprising crystalline potassium chloride, the individual particles of which have a coating comprising the product of alkaline earth salts and an oil-sulfonated oil mixture capable of reacting therewith combined with crystals of said chloride.

5. A composition of matter comprising crystalline potassium chloride, the individual particles of which have a coating comprising the product of alkaline earth salts and an oil-sulfonated alcohol mixture capable of reacting therewith combined with crystals of said chloride.

6. The production of moisture-repellent potassium chloride from potassium chloride containing an alkali-earth salt as an impurity, which comprises coating the potassium chloride particles with an oil-soap solution emulsion, and subjecting the coated particles to a drying action.

ARTHUR J. WEINIG.